Sept. 14, 1926.

C. S. SAGE 1,599,792

APPARATUS FOR MAKING HEAT EXCHANGE UNITS

Filed June 19, 1923    6 Sheets-Sheet 1

Fig. 1.

INVENTOR
C. S. Sage
BY
Howard P. Denison
ATTORNEY

Sept. 14, 1926.

C. S. SAGE 1,599,792

APPARATUS FOR MAKING HEAT EXCHANGE UNITS

Filed June 19, 1923    6 Sheets-Sheet 6

INVENTOR
C. S. Sage
BY Howard P. Denison
ATTORNEY

Patented Sept. 14, 1926.

1,599,792

UNITED STATES PATENT OFFICE.

CHARLES S. SAGE, OF SYRACUSE, NEW YORK, ASSIGNOR TO SAGE RADIATOR COMPANY, INC., OF SYRACUSE, NEW YORK, A CORPORATION OF NEW YORK.

APPARATUS FOR MAKING HEAT-EXCHANGE UNITS.

Application filed June 19, 1923. Serial No. 646,366.

This invention relates to apparatus for making heat exchange units of the class set forth in my pending applications, Serial Number 448,051 filed February 26, 1921 and 536,077 filed May 2, 1923, in which a multiplicity of previously formed sheet metal fins are assembled upon one or more heat conducting tubes for cooling, radiating and other heat exchanging purposes.

The main object of my present invention is to provide simple and efficient means for expeditiously forming the fins from a continuous strip of sheet metal without appreciable waste, and for automatically assembling the finished fins in uniform relation in a suitable holder which may be removed from the machine with the assembled fins therein to permit the insertion of the solder-coated tubes therethrough while still in the holder and also to permit the tubes with the fins thereon to be removed from the holder and subjected to heat for securing the fins to the tubes and thereby to complete the heat exchange unit ready to receive the end manifolds of any suitable design.

Other objects and uses relating to specific features of the invention will be brought out in the following description.

The apparatus shown comprises a main supporting frame —1— having a horizontal bed plate —2— and an upwardly extending bracket —3— at the rear, the bed plate —2— being provided with a forward extension —4— and a rearward extension —5—.

A reel —6— carrying the stock strip of sheet metal, as —a—, from which the fins are to be formed, is journaled in suitable bearings —7— on the rear end of the extension —5— to rotate about a transverse horizontal axis in approximately the horizontal plane of the bed plate —2—.

*Strip feed.*

A pair of feed rollers —8— and —9— are journaled in suitable bearings —10— and —11— in an upright bracket —12— on the bed plate —2— just in front of the reel —6— for feeding the stock strip —a— from the reel forwardly across the upper surfaces of the bed plate —2—, the bearings —11— for the upper feed roll —9— being spring pressed toward the axis of the underlying roller —8— through the medium of bearing pins —13— which are engaged by a plate —14—, the latter being movable vertically along a guide bolt —15— having its lower end enlarged and engaged with the top of the bracket —12— and its upper end provided with an adjustable stop shoulder —16— for one end of a coil spring —17— having its other end engaged with the upper side of the plate —14— to exert downward pressure upon said plate, and thereby to yieldingly impinge the stock strip —a— between the meeting faces of both feed rollers —8— and —9—.

A driving shaft —18— is journaled in suitable bearings —19— on the upper end of the bracket —3— and is provided at one end with a pulley —20— adapted to be connected by a belt —21— to any available source of applied power, not shown, for rotating the shaft —18— continuously.

Figure 3:
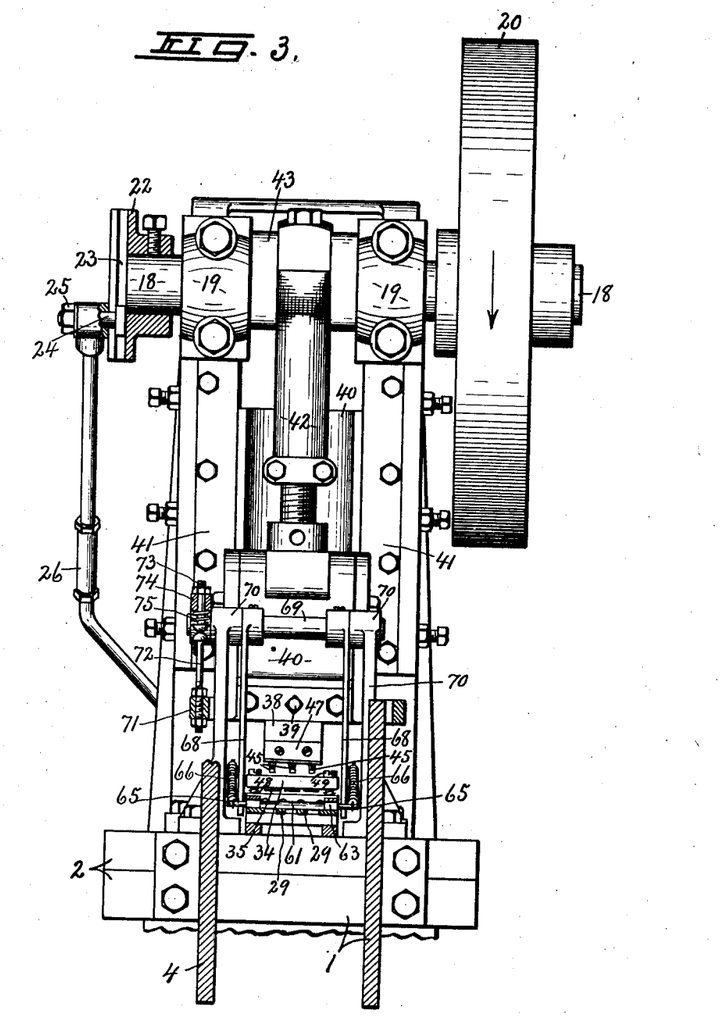
Fig. 3 is an enlarged front elevation, partly in section, taken on line 3—3, Fig. 1.

The other end of the shaft is provided with a disk —22— having a diametrically extending guideway —23— for receiving a crank pin —24— which is adjustable in said guideway to vary its throw and is held in its adjusted position by a clamping nut —24—, Figure 3.

A pitman or connecting rod —26— has one end pivotally connected to the crank pin —24— and its other end eccentrically connected to a one-way drive clutch —27— on the outer end of the lower feed roller —8— for rotating the latter through a limited arc of movement at each revolution of the driving shaft —18—.

This movement is therefore, intermittent and is regulated by the adjustment of the crank pin —24— in the guideway —23— to feed the strip —a— forwardly a distance substantially equal to the length of one fin at a time between suitable sets of dies presently described.

Fin forming mechanism.

Figures 5, 6:
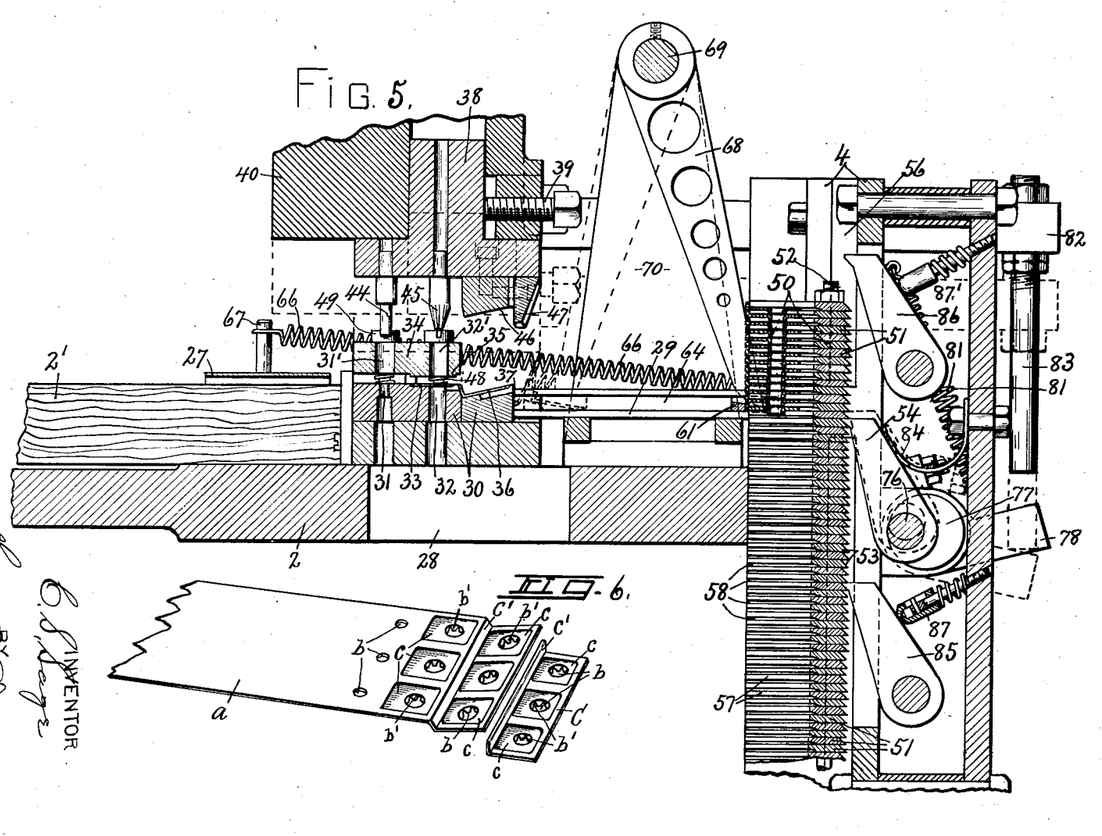
Fig. 5 is a longitudinal vertical sectional view taken approximately in the plane of line 5—5, Fig. 4, showing also the lower portion of the reciprocating plunger carrying the upper punching and forming dies and a cutter.
Fig. 6 is a perspective view of a portion of the blank from which the fins are formed showing the manner of forming the fins and one of the finished fins as detached.

The stock strip —a—, as it is fed into the machine, is flat and of a width corresponding to the width of the fin to be formed thereby avoiding the necessity for lengthwise shearing and waste incidental thereto, the strip being fed along the upper surface of a work table —2'— which is secured to the upper face of the bed plate —2—, Figure 5, and is provided with a guide —27— for alining the stock tape or strip with the dies.

An opening —28— in the bed plate —2— directly beneath the dies permits material punched from the tape or strip by said dies to fall therethrough.

Supported upon the bed plate —2— directly in front of the dies, is a series of lengthwise guide bars —29— arranged in transversely spaced relation to guide the detached fins from said dies to the holder in a manner hereinafter described.

The forward end of the work table —2'— and rear end of the guides —29— are spaced some distance apart, lengthwise of the machine to receive a female die —30— which is supported upon the bed plate —2— directly over the opening —28— with its upper face disposed in approximately the same horizontal plane as that of the work table —2'— to permit the stock strip —a— to be fed through the guide —27— across the upper face thereof.

This female die —30— is provided with a series of, in this instance three, similar vertical punch receiving holes —31— extending therethrough from top to bottom to communicate with the opening —28— and gradually increasing in diameter from top to bottom to allow the material punched from the stock strip to pass therethrough, said holes being arranged in uniformly spaced relation transversely of or at right angles to the path of movement of the strip —a— as the latter is fed into the machine, said holes being wholly within the longitudinal edges of the strip.

The die —30— is also provided with a corresponding number of vertical reamer receiving holes —32— directly in front of and in longitudinal alinement with the holes —31—, but are slightly larger than the punch receiving holes to permit the marginal walls of the holes which are formed in the strip to be enlarged and flanged into the opening —32— by the reaming punches presently described.

The upper face of the die —30— is provided with a series of shallow recesses —33— surrounding the adjacent ends of the openings —32— for receiving corresponding shallow bosses on the underside of a superposed vertically movable die section —34—, Figure 5, said bosses as —35—, being of substantially the same contour as the recesses —33— to cooperate therewith for the purpose of embossing and reinforcing the fins against buckling.

The front end of the die —30— is provided with an angular recess —36— in its upper face cooperating with a corresponding portion of the male die for bending the fins into angular form after they have been punched and reamed, the upper front edge of the female die constituting a shearing face —37— for cooperation with a shearing blade on a superposed reciprocatory die —38—.

This male die —38— is secured by a set screw —39— in a socket in the lower end of a vertical movable plunger —40— which is guided in upright ways —41— on the front face of the upwardly extending bracket —3— and is connected by an extensible pitman —42— to a crank arm —43— on the shaft —18— whereby the rotation of said shaft will reciprocate the plunger and male die carried thereby.

The lower end of the male die —38— is provided with a set of punches —44—, a separate set of reamers —45—, an angle block —46— and a shearing blade —47— arranged in sequence from the rear side of the die —38— forwardly and forming a part of the male die.

The punching dies —44— correspond in number and size, and are vertically alined with the openings —31— in the female die to cooperate with the latter for punching a corresponding number of holes —b— in the strip —a— at each downward movement of the plunger —40—, the punched out portions of the strip being discharged through the opening —28—.

The reaming dies —45— correspond in number and size, and are registered with the openings —32— in the female die, but are of relatively larger diameter than that of the punching dies, and are provided with tapered circumferentially corrugated lower ends for enlarging the holes —b— as they are registered with the reaming dies and also for producing reinforcing flanges —b'— around the marginal edges of the enlarged openings formed by the reaming dies at each downward movement of the plunger.

The embossing die —34— is yieldingly supported by springs —48— for slight vertical movement, directly over the die —30— and is guided by bolts —49— and is also provided with separate sets of openings —31'— and —32'— registering respectively with the openings —31— and —32— in the underlying die —30— and of sufficient size to permit the punch dies —44— and —45— to pass freely therethrough.

This embossing die —34— is normally held by the springs —48— in spaced relation to the underlying die —30— to allow the strip —a— to be fed between those dies, but when the plunger —40— is forced to its extreme downward position, the lower face of the male die —38— engages and depresses the embossing die —34— into pressing coaction with the underlying die —30— to produce relatively shallow bosses —c— around the reamed holes —b— for reinforcing purposes.

The angle-forming die —46— on the lower face of the main die —8— cooperates with the angular depression —36— in the underlying portion of the female die for producing lengthwise flanges —c'— along one edge of each fin as —C— so that when the fins are assembled in the holder hereinafter described, the free edge of each flange —c'— will lie close to the next adjacent fin for the purpose of producing passages or cells between the fins when assembled as a heat exchange unit, it being understood that the angle forming die —46— is brought into pressing coaction with the underlying portion of the die —30— at each downward movement of the plunger.

The shearing blade —47— on the lower end of the male die —38— is also brought into shearing relation to the shearing edge —37— of the underlying die —30— at each downward movement of the plunger, for severing the previously formed fin —C— on the front end of the strip along the junction of its flange —c'— with the next adjacent fin thereby completing the formation of the individual fin preparatory to assembling it in a holder —50—.

This holder preferably consists of a multiplicity of similar and therefore, interchangeable metal plates —51— each of substantially the same thickness as the width of the flange —c— of the fin —C— and assembled flatwise, one upon the other to any suitable height corresponding to the length desired for the heat exchange unit, and are tightly clamped together by clamping bolts —52— passed through registering openings therein preferably near the front edges thereof, said front edges being beveled and disposed in the same vertical plane to form a toothed rack —53— adapted to be engaged by a vertically movable pawl —54— presently described, for feeding the holder vertically, one tooth space at a time.

The front edges of the plates are somewhat wider than their rear portions to form laterally projecting flanges —55— which are movable in suitable ways —56— in the front upright portion —4— of the frame for guiding the holder in its vertical movement.

The width of the rear portions of the plates —51— is approximately equal to, but slightly greater than that of the fins —C— and are provided with lengthwise slots —57— extending forwardly from their rear edges in longitudinal alinement with the lower die openings —31— and —32— for receiving the flanged bosses —b'— on the under sides of the fins as the latter are fed into the holder, said rear portions of the plates —51— being also somewhat thinner than their front portions to form intervening relatively shallow grooves —58— of just sufficient depth to easily receive the main bodies of said fins exclusive of their flanges —c'— which are caused to abut against the rear ends of the plates as the fins are fed into the holder.

The guide bars —29— are also arranged in transversely spaced relation to form intervening lengthwise slots —60— alined with the slots —57— for receiving the flanged bosses —b'— of the fins and permitting the latter to be fed along the guides from the dies to the holder.

These guides are disposed in a horizontal plane, a short distance below the upper face of the female die —30—, to allow the severed fins to fall thereon.

*Fin feed.*

Figure 4:
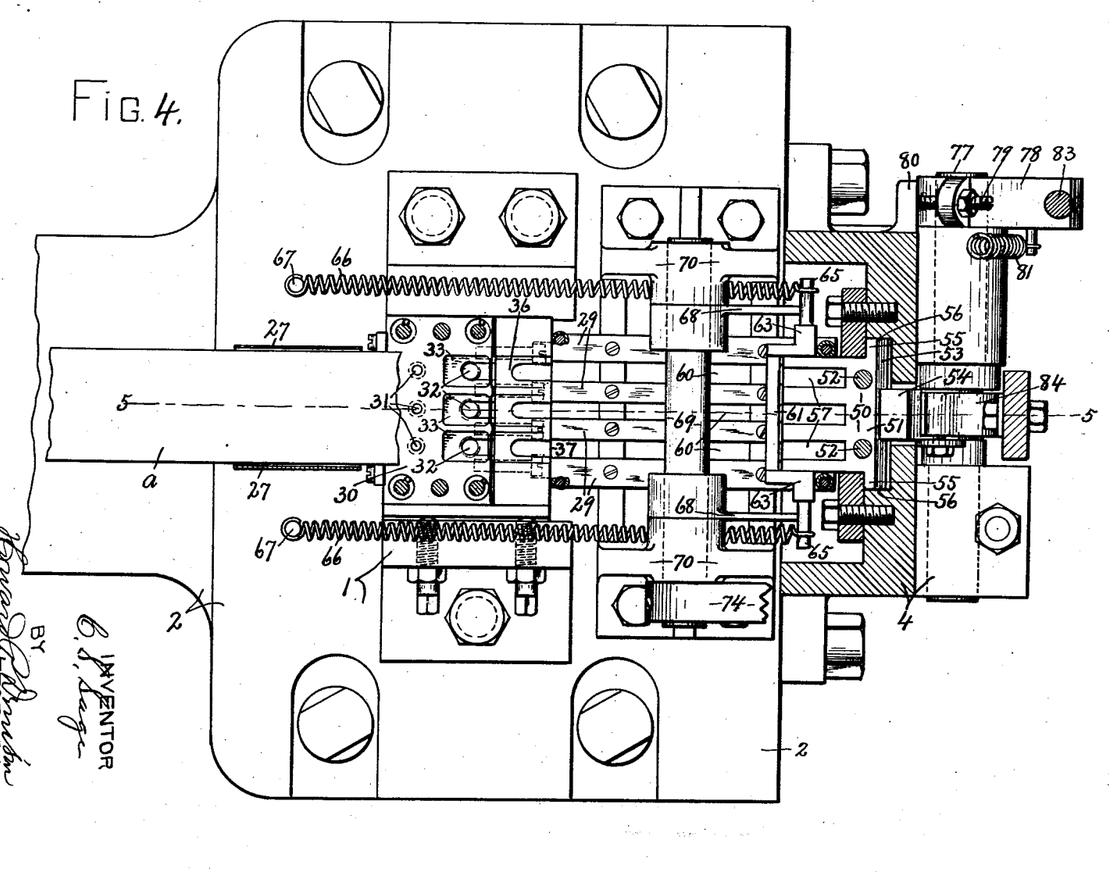
Fig. 4 is an enlarged top plan, partly in section, and partly broken away, showing more particularly the lower dies and bed over which the sheet metal strip is fed, and also showing the holder in which the finished fins are assembled together with the means for feeding the detached fins into the holder, but omitting the upper reciprocatory dies, punches and cutter.

The means for feeding the severed fins from the dies to the vertically movable holder —50— consists of a carrier —61— slidable along and upon the upper faces of the guide bars —29— between the die —30— and holder —50— and has its opposite sides provided with offset extensions —63— movable in guide slots —64— in the frame of the machine, Figures 4 and 5, said extensions being provided with pins —65— which are connected by springs —66— to stationary pins —67— on the rear end of the frame for retracting the carrier —61— toward the female die —30— in position for receiving and engaging the severed fin and feeding the fin forwardly into the registering groove —58— of the holder.

After the severed fins drop upon the guide ways —29— in advance of the carrier —61—, the latter is movable forwardly against the action of the springs —66— to feed the fins in the registering grooves —58— by means of a pair of crank arms —68— which are secured to a superposed rock shaft —69—, the latter being journaled in suitable bearings —70— on the main supporting frame directly over the guideway —29—.

The operation of the feed roller —8— is timed to feed the strip —a— forwardly, a distance substantially equal to the distance between the centers of the punching die —44— and reaming die —45— during the upward movement of the plunger —40— immediately following each punching and forming operation so that the first operation upon the strip, punches the holes —b—, the next operation reams the previously punched holes, embosses the strip around the reamed holes and punches another set of holes for the next succeeding fin while the next operation of the strip bends the first named fin blank into angular form, reams and embosses the next succeeding fin and punches the holes in the following fin blank.

The next operation of the strip causes the first named fin to be severed, the second fin to be bent into angular form, the third fin to be reamed and embossed, and the holes punched in the fourth fin blank, after which the four operations are repeated simultaneously.

The movement of the crank arms —68— is timed to allow the carrier —61— to be retracted to the dotted position, in Figure 5 just preceding the engagement of the male die with the work, and thereby to cause the severed pin to drop upon or in front of the carrier.

A forwardly projecting arm —71— is secured to the lower end of the plunger —40— to move vertically therewith, and is provided at its front with an upwardly projecting stud or pin —72— adapted to engage a similar but yielding pin —73— on the arm —74— of the crank shaft —69— for imparting a forward rocking movement to the arms —68— against the action of the springs —66— and thereby to move the carrier —61— and the detached fin —C— carried thereby forward into the registering slot —58— of the holder —50—.

This forward movement of the carrier is timed to take place as the plunger —40— approaches its upward limit of movement following the formation and severing of each fin by each downward movement of the plunger.

The contacting pins —72— and —73— are both adjustable endwise to effect the desire throw of the levers —68—.

A coil spring —75— is interposed between the head of the pin —73— and under side of the crank arm —74— to allow the full return upward movement of the plunger and also to cause the detached fin to be forced into the registering slot —58— under a yielding pressure.

*Fin holder feed.*

The fin holder —50— is initially set in its extreme down position with its uppermost slot —58— registered with the upper face of the guide —29— and carrier —61— but is adapted to be fed upwardly step by step one tooth space at a time as the finished fins are successively inserted in the slots, and for this purpose, the feeding pawl —54— is eccentrically pivoted at —76— to a horizontal rock shaft —77— which is journaled in suitable bearings on the front upright portion of the frame of the machine and is provided at one end with a forwardly projecting crank arm —78— having an adjustable stop —79— above its pivot adapted to be yieldingly held against a fixed stop member —80— by a retracting spring —81—.

The lower end of the plunger is provided with a forwardly projecting arm —82— having a vertically adjustable pin —83— extending downwardly from the outer end thereof and adapted to engage the front end of the crank arm —78— as the plunger —40— is lowered into pressing coaction with the underlying die —30— for rocking the shaft —77— about its axis and thereby raising the eccentrically pivoted pawl —54— and the fin holder —50— one tooth space at a time, said pawl being yieldingly held against the teeth of the rack —53— by a bow spring —84—.

Suitable holding pawls or detents —85— and —86— are pivotally mounted upon the support —4— below and above the rock shaft —77— and are spring-pressed into engagement with the teeth of the rack —53— by yielding members —87— and —87'—, the lower detent —85— serving to retain the holder —50— in its adjusted position when the upper end is below the nib of the upper pawl —86— while the upper detent serves a similar purpose when the lower end of the holder is above the lower pawl —85— thereby assuring the retention of the holder —50— in its adjusted position against the downward movement as it is elevated step by step by the action of the feeding pawl —54—.

The feeding action of the pawl —54— for lifting the holder —50— one tooth space takes place immediately following the feeding of a fin into the registering slot therein or during the downward stroke of the plunger and retracting movement of the carrier which reaches its limit of rearward movement just in advance of the shearing operation upon the front-most fin thereby bringing the next succeeding open slot into registration with the guide —29— ready to receive the severed fin as the plunger is raised, then as the plunger approaches the limit of its upward movement which operates the crank arms —68— to advance the carrier and fin carried thereby into the registering slot or groove —58— the holder —50— is held in its adjusted position by one or the other or both of the pawls —85— and —86— and the feeding pawl —54— is lowered for re-engaging the next succeeding tooth ready for a repetition of the operation just described, these operations being repeated until the holder —50— is filled with the previously formed fins.

When the holder —50— is filled with the sheet metal angle plates, it is removed from the machine and while the angle plates are still stacked therein suitable solder-coated tubes are inserted through the registering apertures of the angle plates and also through the open ended slots —57— of the holder thereby forming a tie between the several angle plates, after which the solder-coated tubes with the angle plates thereon may be removed from the holder —50— through the open ends of the slots —57— and subjected to sufficient heat to melt the solder and thereby to secure the plates to the tubes ready for installation in the radiator or other heat exchange system.

Figure 1:
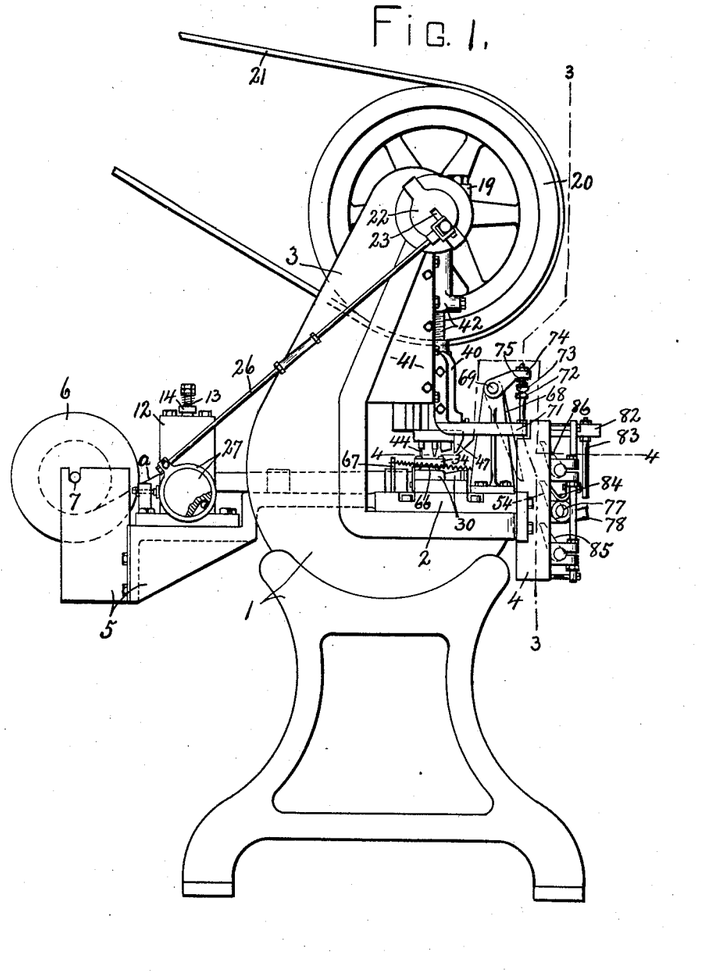
Figure 1 is one side elevation of a machine or apparatus embodying the various features of this invention.
Figure 2:
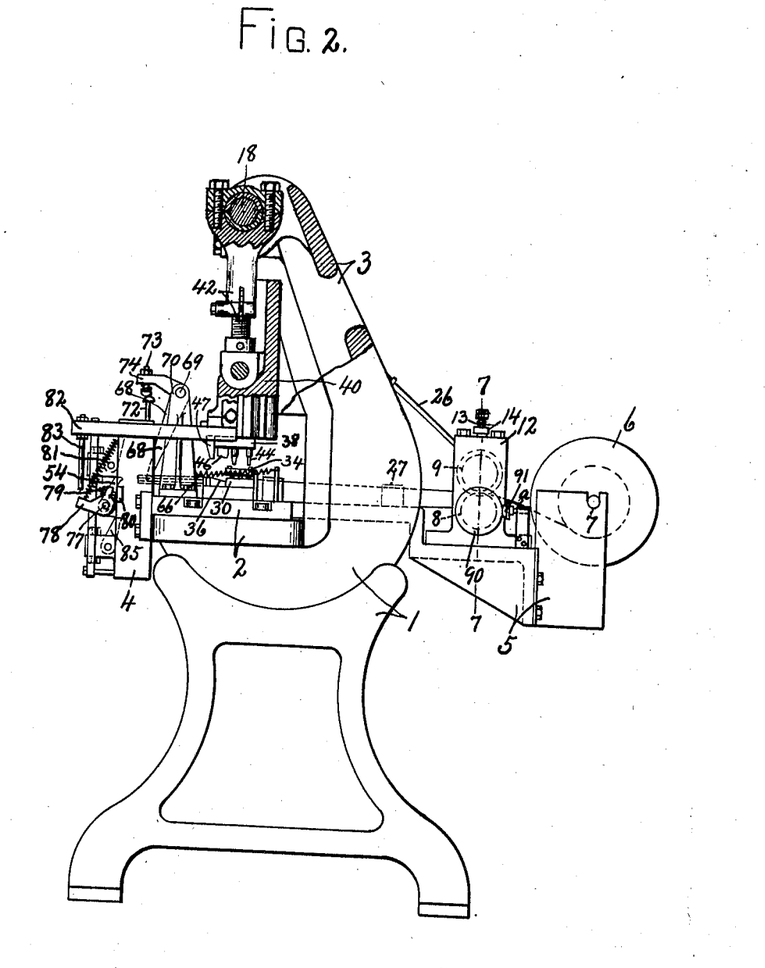
Fig. 2 is an opposite side elevation, partly in section, of the same machine.
Figure 7:
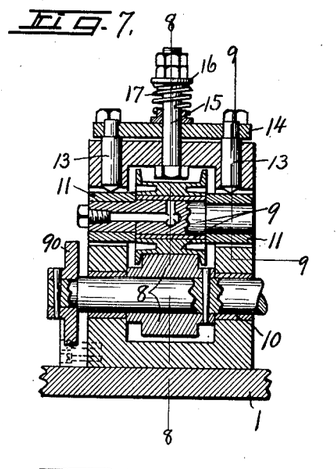
Fig. 7 is an enlarged transverse vertical sectional view taken on line 7—7, Fig. 2.
Figure 8:
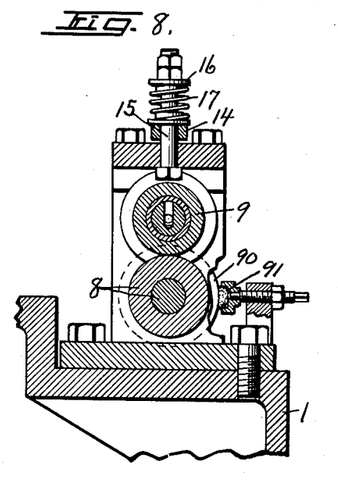
Figs. 8 and 9 are sectional views taken respectively in the planes of lines 8—8, and 9—9, Fig. 7.
Figures 9, 10:
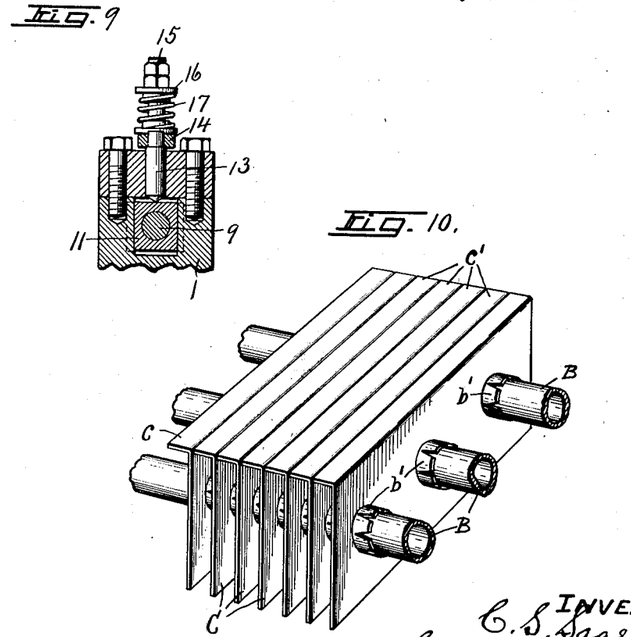
Fig. 10 is a perspective view (enlarged) of a portion of one of the heat exchange units.

In order to assure the feeding of the strip —a—, a predetermined distance by each intermittent operation of the feed roller —8— and also to prevent buckling of the strip or tape, one end of the roller —8— is provided with a brake drum —90— adapted to be engaged by a brake shoe —91— which is adjustably mounted upon the frame —1— to vary its friction with the periphery of the drum —90— as shown in Figs. 2, 7 and 8.

Operation

The shaft —18— is rotated continuously and, through the medium of the connecting rod —26— imparts intermittent rotary movement to the feed roll —8— between which and the feed roll —9—, the strip —a— is intermittently fed one fin space at a time by the action of the one way clutch —27—.

During each period of rest of the tape, the plunger —40— is forced downwardly into pressing coaction with the underlying dies to produce the desired punching, reaming, angle-forming and severing in one and the same operation.

Immediately following the severing of the foremost fin, the latter drops onto the carrier —61— and thereby is carried forwardly into the registering groove in the holder —50—.

Immediately following the insertion of the severed fin into the holder, the latter is raised one tooth space by the action of the pawl —54— which occurs during the final pressing and cutting operation of the plunger, it being understood that just preceding this action or during the beginning of the downward stroke of said plunger, the carrier is allowed to return to its starting position by the action of the spring —66— ready for a repetition of the operations just described.

What I claim is:

1. In an apparatus for forming angle plates from sheet metal strips, cooperative dies, means for intermittingly feeding a strip of sheet metal between the dies, said dies having means for pressing the interposed portions of the sheet metal strip into angular form and additional means for severing the angularly formed portions from the strip, said severed angular portions being successively fed forwardly at each forward movement of the strip, means for operating one of the dies to effect the formation of said angular portions, a holder having spaced guide grooves for receiving the severed angular portions, means for transferring said severed portions from the dies to the holder as they are severed and means for shifting the holder to successively present the guide grooves to the transferring means.

2. An apparatus for forming angular plates from a sheet metal strip as in claim 1 in which the dies are provided with means for punching holes in the interposed portion of the strip preceding the angular formation thereof.

3. An apparatus for forming angular plates from a sheet metal strip as in claim 1 in which the dies are provided with means for punching openings in the interposed portion of the strip and with additional means for pressing the walls of the openings in one direction to form flanges surrounding the openings.

4. In an apparatus for making heat exchange units of the character described, a vertically movable holder having a multiplicity of horizontal grooves in uniformly spaced relation, one above the other, means for feeding the holder vertically one groove space at a time, means for intermittingly feeding a strip of sheet metal a predetermined distance at a time toward the holder, means for cutting the strip into uniform lengths at each successive forward movement thereof, means for bending the severed lengths into angular form and additional means for successively feeding the severed lengths into the grooves in the holder as said grooves are successively brought to a predetermined level.

5. A machine for making heat exchange units of the character described, as in claim 4, in which the cutting means includes a plunger and punching dies thereon for perforating the strip after each successive forward movement.

6. In an apparatus for making heat exchange units of the character described, a vertically movable holder having a multiplicity of horizontal grooves in uniformly spaced relation one above the other, means for feeding the holder vertically one groove space at a time, means for intermittingly feeding a strip of sheet metal a predetermined distance at a time toward the holder, means for cutting the strip into uniform lengths at each successive forward movement thereof, said cutting means including a plunger and an angle forming die thereon for bending the strip into angular form after each successive forward movement thereof, and additional means for successively feeding the severed lengths into the grooves in the holder as said grooves are successively brought to a predetermined level.

7. In a machine for making heat exchange units of the character described, an elongated holder movable in the direction of its length and provided with a multiplicity of grooves each open at one and the same side, and in uniformly spaced relation, means for feeding the holder lengthwise one groove space at a time, means for intermittingly feeding a strip of sheet metal endwise toward the open sides of the grooves, cooperative punching dies between the strip-feeding means and the holder for perforating the strip at each successive forward movement thereof, means for bending the perforated portions of the strip into angular form, a plunger for operating one of the punching dies, cooperative shearing members for severing the perforated portions of the strip at each successive forward movement thereof, one of said shearing members being actuated by the plunger, and means for feeding the severed lengths of the strip into the grooves of the holder as said grooves are successively presented to a certain point.

8. In a machine for making heat exchange units of the character described, a vertically movable holder having a multiplicity of horizontal grooves in uniformly spaced relation one above the other and each open at one side, means for feeding the holder vertically one groove space at a time, means for intermittingly feeding a strip of sheet metal endwise toward the open sides of the grooves, means for perforating the strip at each forward movement thereof, additional means for bending the perforated portions of the strip into angular formation, further means for severing the angular portions from the strip, and means for successively feeding the severed members into successive grooves of the holder as said grooves are sequentially brought to a predetermined level.

9. In a machine for making heat exchange units of the character described, a vertically movable holder having horizontal grooves in uniformly spaced relation, one above the other, means for feeding the holder vertically one groove space at a time, means for intermittingly feeding a strip of sheet metal endwise toward the holder, means for perforating the strip at each successive forward movement thereof, means for enlarging and flanging the walls of the perforations, means for bending the perforated portions of the strip into angular formation after the walls of said perforations have been enlarged and flanged, means for severing the angular portions from the strip, and means for successively feeding the severed portions into successive grooves of the holder as said grooves are presented to a predetermined level.

In witness whereof I have hereunto set my hand this 12th day of June, 1923.

CHARLES S. SAGE.